June 11, 1946. T. VEITCH ET AL 2,401,781
INTERNAL-COMBUSTION ENGINE
Filed Feb. 20, 1943 3 Sheets-Sheet 1
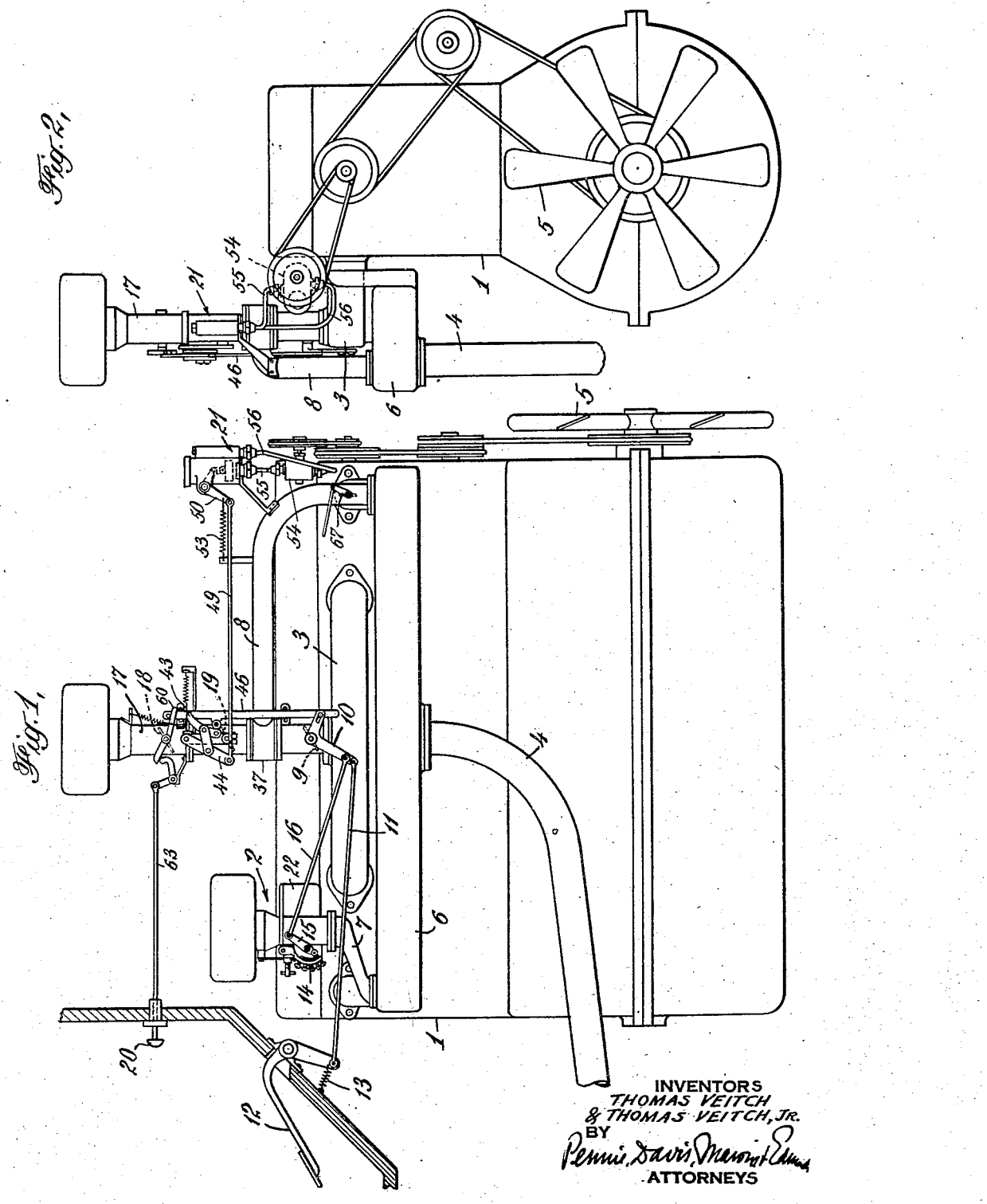
INVENTORS
THOMAS VEITCH
& THOMAS VEITCH, JR.
BY
ATTORNEYS

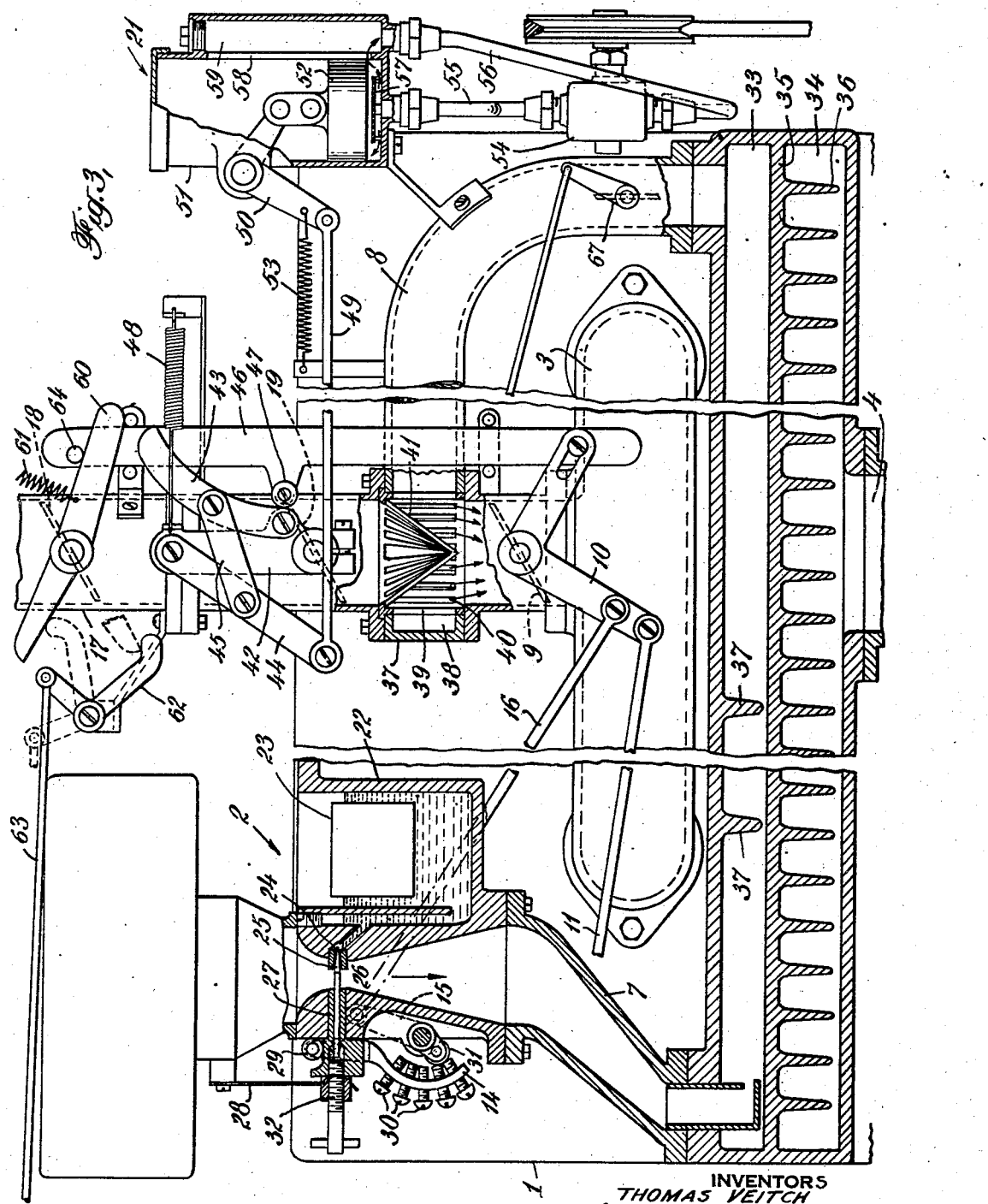

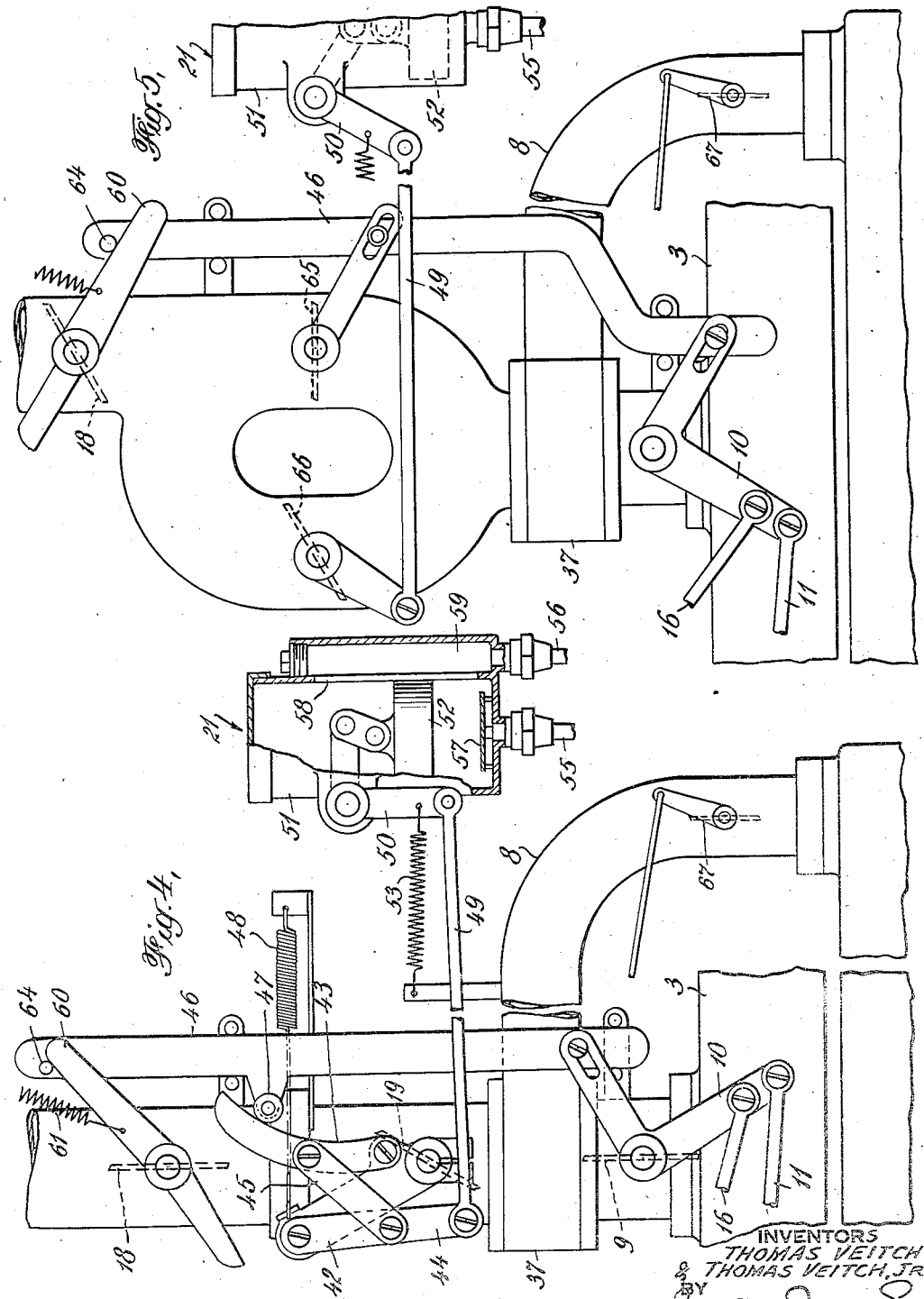

Patented June 11, 1946

2,401,781

UNITED STATES PATENT OFFICE 2,401,781

INTERNAL-COMBUSTION ENGINE

Thomas Veitch and Thomas Veitch, Jr.,
Deal, N. J.

Application February 20, 1943, Serial No. 476,532

14 Claims. (Cl. 123—133)

This invention relates to internal combustion engines and has for its general object improvement in the efficiency of such engines.

Internal combustion engines will operate on fuel and air mixtures varying in composition over a considerable range, but for maximum torque and acceleration the richer mixtures are necessary. Thus, with engines applied to motor vehicles, a rich mixture is required for starting and accelerating, but not for running at constant speeds. Such engines would, therefore, operate at higher efficiency if, as the running speed were approached, the composition of the fuel and air mixture supplied to the cylinders could be shifted from the rich toward the lean end of the range—and shifted back again as the speed slackened. Various means have been proposed to effect this result, but none, so far as we are aware, has been wholly satisfactory. It is one of the objects of the present invention to provide a satisfactory means to produce a rich mixture at low speeds, on starting and accelerating without the use of the acceleration pump, and to increase the proportion of air with increased speed, thereby operating at maximum efficiency at all speeds. We have attained this object as follows: A relatively rich fuel and air mixture is produced at the carburetor, which is provided with a variable fuel feed jet. This mixture, leaving the carburetor, merges in a mixing chamber with a stream of supplemental air from a bypass, which is provided with an adjustable air-control valve, and enters the intake manifold, the throttle valve lying between the mixing chamber and the manifold. The variable fuel jet and the throttle valve are controlled directly by the accelerator. The adjustable air-control valve is opened part way by the accelerator, but its final setting is determined by the speed of the engine—the greater the speed, the wider the opening. Thus a rich mixture is supplied at low speeds and at starting, but as acceleration proceeds the motor further opens the air-control valve to admit more air to the mixing chamber until the proper fuel and air mixture for maximum efficiency at the instant speed has been reached. On deceleration a reverse action takes place.

Another object of our invention is to assure complete combustion of the fuel, making for greater economy, decreasing the tendency to detonate and eliminating crankcase dilution. We attain this object by the use of a preheating retort through which the fuel mixture from the carburetor is passed and the fuel thoroughly gasified before being mixed with fresh air from the bypass. The use of retorts, heated by the exhaust gases, for preheating the fuel mixture from the carburetor is not new, but difficulty has been experienced in controlling motors equipped with such retorts. With the control system of our invention, however, the use of a retort adds to the efficiency of the engine and introduces no problems of control. Our invention also permits the use of less volatile fuels, such as furnace oil or Diesel engine oil. Not only does it add to overall efficiency when the engine is operating at normal speed, it obviates the necessity for providing an over-rich mixture for idling, as with conventional carburetion, with consequent fuel waste and over-loading if the idling is continued for even short periods. Our method of carburetion gives a completely burning mixture at idling speeds and, therefore, makes it possible to idle the engine indefinitely without over-loading and waste or the formation of carbon on the spark plugs and in the combustion chamber.

We have illustrated certain embodiments of our invention in the accompanying drawings in which Figure 1 is a side elevation of a typical automobile engine modified in accordance with our invention; Figure 2 is an end view of the same engine; Figure 3 is a side elevation on an enlarged scale, partly in section, of the top of the engine of Figure 1 showing the choke valve closed and the other parts in idling position; Figure 4 is a fragmentary view showing the position of the parts when the engine is running with the throttle valve wide open; and Figure 5 is a fragmentary view showing a modified air valve arrangement.

In these drawings 1 represents the engine block of a typical automobile engine on which is mounted a carburetor 2, an intake manifold 3, an exhaust 4 and a fan 5. Forming part of the passage between the carburetor and the intake manifold is a preheating retort 6 heated by the hot gases from the engine on their way to the exhaust 4. The fuel and air mixture from the carburetor passes through a connection 7 to the retort 6 and thence through a pipe 8 to the intake manifold 9. Within the pipe 8 and just above the intake manifold is the throttle valve 9 on the stem of which is a bellcrank 10 to one arm of which is connected a rod 11 which is in turn connected to the accelerator pedal 12 mounted on the foot board of the automobile. The usual spring 13 holds the throttle closed, except for a slight crack, when the driver's foot is removed from the pedal. The carburetor is provided with a fuel feed jet controlled by a metering lever 14 which is swung by means of an arm 15 connected by a rod 16 to the lower arm of the throttle bellcrank 10. Thus as the accelerator pedal is depressed both the throttle and the fuel jet are opened. Joining the pipe 8 just above the throttle is an air by-pass 17 in which is mounted the choke valve 18 and the air-control valve 19. The choke is manually closed by means of a button 20 extending through the panel board of the automobile. The air-control valve is actuated directly from the accelerator with the throttle, but this action is modified and supplemented by means of a speed responsive device 21. The air valve is preferably a balanced valve, as in the example shown, so that it is not influenced by changes in the intake suction. We shall now describe the foregoing parts in greater detail, with particular reference to Figures 3 and 4.

The carburetor 2 is provided with a float chamber 22 having a float 23 from which liquid fuel passes to a jet opening 24 controlled by needle valve 25 within a fixed Venturi throat 26 of such size to provide the correct air speed for idling. The shank of the needle is held within a sleeve 27 passing through the side wall of the venturi and held in position by a spring 28. The outer end of this sleeve fits between and is journaled to the forked ends of the metering lever 14, which has at its upper end a roller 29 bearing against the carburetor body. The lower end of this lever 14 is in the form of an arc, the effective curvature of which is determined by a series of adjustable screws 30. The arm 15 is pivoted to the carburetor body at a point eccentric of the center of curvature of the arc of the lever 14. One end of this arm is provided with a roller 31 which makes contact with the cam surface defined by the screws 30 and the other end is connected by means of the rod 16 to the bellcrank 10, as described above. As the arm 15 is swung about its pivot the roller 31 engaging the inner ends of the screws 30 swings the metering lever 14 about 29 and opens the needle valve. The initial setting of this valve is adjusted by means of its threaded end 32.

The preheating retort 6 through which the fuel and air mixture from the carburetor passes, is preferably constructed in accordance with the disclosure of our copending application, Serial No. 440,404. It comprises two chambers, an upper chamber 33 through which the fuel and air mixture passes, and a lower chamber 34 through which the hot exhaust gases from the cylinders pass to the exhaust 4. The two chambers are divided by a horizontal heat-conducting partition or wall 35 provided with a plurality of depending integral cross ribs 36 which act to absorb the heat from the exhaust gases passing through the lower chamber. The upper chamber is also provided with a lesser number of depending ribs 37 the function of which is to force the fuel mixture into repeated intimate contacts with the hot partition 35, and produce a homogeneous gaseous mixture.

The preheated fuel mixture leaving the retort by way of the pipe 8 enters a mixing chamber 38. This chamber comprises an annular passageway, the inner wall 39 of which is provided with a plurality of vertical slots 40 through which the fuel mixture passes. Within this cylindrical slotted wall is a downwardly pointing conical wall 41 also slotted, through which the supplemental air from the bypass enters the chamber and is mixed with the gaseous fuel.

The fuel and air mixture drawn through the Venturi throat of the carburetor by the suction of the pistons is relatively rich and thus suitable for low speed operation. A leaner mixture, however, is required for greatest efficiency at higher speed. We shall now describe the means we have provided for automatically supplying additional air as the speed of the engine increases and cutting it down as the speed is reduced.

Mounted on the stem of the air-control valve is an arm 42 on which are pivotally mounted two links, a cam link 43 and a second link 44, these links being connected by a third link 45. A vertical bar 46 connected by means of a pin and slot connection to the short arm of the throttle bellcrank 10 is provided with a roller 47 held in contact with the cam link 43 by means of a spring 48 connected to the upper end of the arm 42 and urging it to the right, as shown in Figure 3. The outer end of the link 44 is connected by means of a rod 49 to the long arm of a bellcrank 50 mounted on the control cylinder 51 of the speed responsive device 21, the short arm of which is linked to a piston 52 the operation of which will be described presently. A spring 53 urges the piston 52 toward the lowermost position and the rod 49 to the left. Thus with the parts in the position shown in Figure 3, depression of the accelerator pedal swings the bellcrank 10 counterclockwise, opens the throttle valve, moves bar 46 upward, and, through roller 47 and cam link 43 swings arm 42 and its associated linkwork counterclockwise, thus opening the air-control valve. The parts are so designed, however, that the air-control valve will be opened less than the throttle valve.

The speed responsive mechanism which we use to supplement the action of the accelerator on the air-control valve is preferably of the hydraulic type. It comprises a gear pump 54 driven from a pulley on the fan belt shaft, as shown in Figure 2 and is connected with the control cylinder 51 by an outlet 55 and a return pipe 56. Oil from the gear pump is discharged through the outlet pipe into the bottom of the cylinder when the engine is running and raises the piston. The oil entering the cylinder strikes a baffle 57 which prevents the jet from striking the piston. As the piston rises it uncovers a vertical slot 58 in the side wall of the cylinder through which the oil escapes into a chamber 59 and thence to the return pipe and back to the pump. We prefer to use a gear pump for this purpose because the volume of liquid moved by such a pump is directly proportional to its speed and hence to the speed of the engine. The greater the rate at which oil is pumped into the cylinder 51, the higher the piston 52 is raised before the area of the slot 58 uncovered permits escape of a quantity of oil sufficient to bring the system into equilibrium. As the speed of the engine increases and the piston 52 rises, the bellcrank 50 is swung counterclockwise and this, in turn, results in a further opening of the air-control valve through the linkwork described above, if the throttle valve is open or partly open.

Mounted on the stem of the choke valve 18 is an arm 60 to which is attached a spring 61 which tends normally to hold the choke open. The valve may be manually closed by means of a bellcrank 62 which when swung counterclockwise through button 20 and connecting rod 63 engages the left hand end of the arm 60 and moves the valve 18 into closed position, except for a slight crack. When the choke button is pushed in and the spring 61 is free to act, the choke valve is controlled through the accelerator pedal. The vertical bar 46 is provided near its upper end with a pin 64 which overlies the right hand end of the arm 60. When the throttle valve is in closed position, as shown in Figure 3, the bar 46 is in its lowest position and the pin 64, bearing against the arm 60, closes the choke. As the accelerator pedal is depressed and the bar 46 raised, the spring 61 opens the choke within the limits imposed by the pin 64. The throttle and the choke, therefore, move in unison during normal operation of the engine.

Figure 3 illustrates the position of all of the valves when the engine is at rest or idling. The throttle, air-control and choke valves are all closed, except that the throttle and choke valves are slightly cracked. In Figure 4 we have illustrated the position of these valves when the throttle is fully opened. The choke is likewise fully opened, but the air-control valve has not fully opened because under the conditions assumed, the speed of the engine has not increased to the point where the piston 52 of the speed responsive apparatus is in its uppermost position. It may or may not reach this position, depending upon the conditions under which the engine is operating, but whatever those conditions may be the correct amount of supplemental air is fed to the fuel in the mixing chamber.

In Figure 5 we have illustrated a modified form of the device in which the air-bypass has been bifurcated and an air-control valve placed in each branch. One of these valves 65 is operated in unison with the throttle and the choke, but the other 66 is opened in response to the speed of the engine by means of the mechanism described above. The total air entering the mixing chamber will, therefore, depend, as before, on two factors: the setting of the throttle and the speed of the engine.

The operation is as follows: The choke button is pulled out to close the choke valve, the starter put in action, and the accelerator pressed down to open the carburetor needle valve to give a slightly richer mixture until the retort heats up. When the engine is sufficiently warmed, the choke button is pressed in to allow the choke valve to operate in unison with the throttle. When the engine starts to run normally, the accelerator is pressed down, the roller 31 is raised, gradually opening the needle valve, the throttle is opened and the roller 47 moving along the surface of the cam link 43 opens the air-control valve to provide sufficient air to dilute the rich gasified fuel entering the mixing chamber. As the engine accelerates, the pump 54 supplies an increasing volume of oil to the cylinder 51 raising the piston 52 and further opening the air-control valve to supply additional air for a leaner mixture and maximum economy. In short, the composition of the fuel mixture admitted to the engine is nicely and automatically adjusted to the needs of the engine at the instant speed. If an automobile equipped with our invention and running at uniform speed starts to ascend a hill, the added load on the engine will cause it to slow down. This acts automatically to move the air-control valve toward closing position while the choke and throttle valves remain unchanged. This results in cutting down the amount of supplemental air mixed with the fuel going to the intake manifold and thereby increases the power of the engine to meet the emergency. We have found it almost impossible to stall an engine equipped with our control device. A heavily loaded vehicle thus equipped will accelerate in high gear after slowing for a turn and will run smoothly on the level at a very much slower speed than is possible with the conventional carburetor. When a vehicle equipped with our control starts to descend a hill, and the operator takes his foot off the accelerator, as he normally does, this action instantly closes both the choke and throttle valves. Hence if there is subsequent opening of the air-control valve under the impetus of the increased engine speed this will have no effect. As a matter of fact the action of the speed responsive device on the air-control valve when the throttle is closed and the roller 47 is in its lowermost position is very slight if any. It is only when the roller 47 is substantially above the pivot of the cam link 43 that the action of the speed responsive device is substantial. In the particular construction shown, in which there is little or no opening of the air valve due to increase of engine speed when the throttle is closed, the air valve will act to prevent entrance of air, and no choke valve action need be relied upon for this purpose.

The apparatus illustrated is designed to operate on gasoline. It can, however, be used on higher flash point fuels provided some means are provided for preheating the retort, as for example, an auxiliary starting carburetor using gasoline, as illustrated in our copending application, Serial No. 440,404. In that case means, such as a valve 67, must be provided for closing the passage from the main carburetor 2 during the preheating operation.

The terms manual or manually as used in the following claims are intended to embrace pedal and pedally.

We claim:

1. In an internal combustion engine the combination of a carburetor, an intake manifold, a passage leading the fuel and air mixture from the carburetor to the manifold, a throttle valve in the passage, an air bypass leading to the passage, an air valve in the bypass not responsive to variations in pressure in the intake manifold, manual means for positively actuating the throttle valve mechanical devices for opening and closing said air valve, means responsive to the speed of the engine for actuating certain of said mechanical devices, and manual means for actuating other of said mechanical devices without producing a reaction on the speed responsive means, whereby the air valve is actuatable manually, and also actuatable automatically in response to the speed of the engine.

2. In an internal combustion engine the combination of a carburetor, an intake manifold, a passage leading the fuel and air mixture from the carburetor to the manifold, a throttle valve in the passage, an air bypass leading to the passage, an air valve in the bypass not responsive to variations in pressure in the intake manifold, manual means for actuating the throttle valve, mechanical devices connecting the throttle valve actuating means and the air valve for opening and closing the air valve, and means responsive to the speed of the engine for modifying the action of such mechanical devices in definite ratio to changes in the speed of the engine.

3. In an internal combustion engine, the combination of a carburetor having a variable fuel feed, an intake manifold, a passage leading the fuel and air mixture from the carburetor to the manifold, a throttle valve in the passage, an air bypass leading to the passage, an air valve in the bypass, manual means for actuating the fuel feed, the throttle valve and the air valve, and means responsive to the speed of the engine for supplementing the action of the manual means on the air valve.

4. In an internal combustion engine, the combination of a carburetor having a fuel feed valve, an intake manifold, a passage leading the fuel and air mixture from the carburetor to the manifold, a throttle valve in the passage, an air bypass leading to the passage, an air valve in the bypass, means for actuating the fuel feed valve and the throttle valve, a connection between the throttle valve and the air valve for partly opening the latter as the former is opened, and means responsive to the speed of the engine for further opening the air valve as the speed of the engine increases in response to the opening of the fuel feed valve and the throttle valve.

5. In an internal combustion engine, the combination of a carburetor, an intake manifold, a passage leading the fuel and air mixture from the carburetor to the manifold, a throttle valve in the passage, an air bypass leading to the passage, an air valve in the bypass, an arm movable with the air valve, a cam pivoted on the arm, means movable in response to the speed of the engine, linkwork connecting the valve arm and cam with the speed responsive means, a bar connected with the throttle valve, and a roller on the link engaging the cam, whereby opening of the throttle valve opens the air valve and acceleration of the engine opens it still further.

6. In the combination claimed in claim 5, a pivoted arm for moving the air valve, a cam pivoted on the arm, means movable in response to the speed of the engine, a link pivoted on the arm and connected to the speed responsive means, a second link pivotally connected to the first link and to the cam, a bar connected with the throttle valve, a roller on the link, and a spring urging the arm toward the throttle bar to hold the cam in contact with the roller.

7. A fuel system for internal combustion engines comprising a heated retort, a float level carburetor having a Venturi throat of sufficient area to furnish an explosive fuel mixture for idle operation feeding into the said retort, and an air valve adapted to furnish air to the gasified mixture leaving the retort, a throttle valve controlling the flow of explosive fuel mixture to the engine, manual means for operating said throttle valve, a linkage connecting said throttle valve operating means and said air valve for opening said air valve when the throttle is opened, engine speed responsive means and linkage connecting said engine speed responsive means and said air valve constructed and arranged to positively increase the opening of the air valve over the opening produced by manual operation of the throttle operating means when the speed of the engine increases.

8. In an internal combustion engine, the combination of a carburetor having a fuel feed valve, a preheating retort, an intake manifold, pipes leading the fuel and air mixture from the carburetor through a preheating retort to the manifold, a throttle valve in the pipe leading to the manifold, an air bypass leading to the pipe containing the throttle valve, an air valve in the bypass, means for actuating the fuel feed valve and the throttle valve, a connection between the throttle valve and the air valve for partly opening the latter as the former is opened, and means responsive to the speed of the engine for further opening the air valve as the speed of the engine increases in response to the opening of the fuel feed valve and the throttle valve.

9. In an internal combustion engine the combination of a carburetor, an intake manifold, a passage leading the fuel and air mixture from the carburetor to the manifold, a throttle valve in the passage, an air bypass leading to the passage, an air valve in the bypass, manual means for actuating the throttle valve and the air valve, means responsive to the speed of the engine for supplementing the action of the manual means on the air valve, a choke valve in the bypass, and means for opening the choke valve when the throttle valve is opened.

10. In an internal combustion engine the combination of a carburetor including an adjustable fuel metering valve, an intake manifold, a passage leading the fuel and air mixture from the carburetor to the manifold, a throttle valve in the passage, an air inlet opening into the passage on the side of the throttle valve away from the intake manifold, an air valve in said air inlet opening, manual means for actuating the throttle valve, mechanical devices connecting the throttle valve with the adjustable fuel metering valve for increasing the opening of said fuel metering valve when the throttle valve is opened, mechanical devices connecting the throttle valve actuating means and the air valve for opening and closing the air valve, and means responsive to the speed of the engine for modifying the action of the mechanical devices connecting the throttle valve actuating means and the air valve in accordance with the speed of the engine.

11. A fuel system for internal combustion engines comprising a heated retort, a carburetor including an adjustable fuel metering valve adapted to feed said retort, a throttle valve, manual means for actuating said throttle valve, an air valve arranged to furnish air to the gasified mixture leaving said retort, mechanical devices connecting the throttle valve actuating means with said adjustable fuel metering valve, mechanical devices connecting said throttle valve actuating means with said air valve, and means responsive to the speed of the engine for modifying the action of the mechanical devices connecting the throttle valve actuating means and the air valve in accordance with the speed of the engine.

12. In an internal combustion engine, the combination of a carburetor, an intake manifold, a passage leading the fuel and air mixture from the carburetor to the manifold, a throttle valve in the passage, an air by-pass leading to the passage, a balanced air valve in the by-pass, manual means for actuating the throttle valve, mechanism connecting the throttle valve actuating means and the air valve for opening the air valve when the throttle valve is opened, governor means responsive to the speed of the engine and mechanism connecting the governor means with the air valve for opening the air valve when the engine speed increases.

13. In an internal combustion engine, the combination of a carburetor, an intake manifold, a passage leading the fuel and air mixture from the carburetor to the manifold, a throttle valve in the passage, an air by-pass leading to the passage, an air valve in the by-pass, manual means for actuating the throttle valve, mechanism connecting the throttle valve actuating means and the air valve for opening the air valve when the throttle valve is opened, governor means responsive to the speed of the engine and mechanism connecting the governor means with the air valve for opening the air valve when the engine speed increases, the mechanism connecting the governor and the air valve being so constructed and arranged that it will not substantially open the air valve when the throttle valve is closed, irrespective of the speed of the engine.

14. In an internal combustion engine, the combination of a carburetor, an intake manifold, a passage leading the fuel and air mixture from the carburetor to the manifold, a throttle valve in the passage, an air by-pass leading to the passage, an air valve in the by-pass, manual means for actuating the throttle valve, mechanism connecting the throttle valve actuating means and the air valve for opening the air valve when the throttle valve is opened, governor means responsive to the speed of the engine and mechanism connecting the governor means with the air valve for opening the air valve when the engine speed increases, said governor means and said mechanism being so constructed and arranged that the action of the governor means is not interfered with by the action of said mechanism.

THOMAS VEITCH.
THOMAS VEITCH, Jr.